(12) United States Patent
Vandyke

(10) Patent No.: US 9,996,087 B2
(45) Date of Patent: Jun. 12, 2018

(54) FLOW CONTROL DEVICE AND METHODS OF ATTACHMENT

(71) Applicant: THE BOEING COMPANY, Chicago, IL (US)

(72) Inventor: Bryce A. Vandyke, Snohomish, WA (US)

(73) Assignee: The Boeing Company, Chicago, IL (US)

(*) Notice: Subject to any disclaimer, the term of this patent is extended or adjusted under 35 U.S.C. 154(b) by 207 days.

(21) Appl. No.: 14/987,515

(22) Filed: Jan. 4, 2016

(65) Prior Publication Data
US 2017/0192440 A1 Jul. 6, 2017

(51) Int. Cl.
G01F 1/42 (2006.01)
G05D 7/01 (2006.01)
F16L 55/00 (2006.01)

(52) U.S. Cl.
CPC ............ G05D 7/0186 (2013.01); F16L 55/00 (2013.01)

(58) Field of Classification Search
CPC .................................. F16L 21/00; F16L 23/024
USPC .................. 138/44, 109; 285/417, 322, 343; 73/861.61, 861.62
See application file for complete search history.

(56) References Cited

U.S. PATENT DOCUMENTS

| | | | | |
|---|---|---|---|---|
| 2,942,465 A * | 6/1960 | Carbone | ................... | G01F 1/44 138/44 |
| 3,680,376 A * | 8/1972 | Catheron | ................... | G01F 1/42 73/861.61 |
| 4,344,752 A * | 8/1982 | Gallagher, Jr. | ........ | B01F 5/0413 137/888 |
| 4,422,339 A * | 12/1983 | Gall | .......................... | G01F 1/42 138/44 |
| 4,557,296 A * | 12/1985 | Byrne | ....................... | G01F 1/42 138/44 |
| 6,101,885 A * | 8/2000 | Touzin | ....................... | G01F 1/42 73/861.22 |
| 6,164,142 A * | 12/2000 | Dimeff | ....................... | G01F 1/42 600/538 |
| 6,725,731 B2 * | 4/2004 | Wiklund | ............. | F15B 15/2838 73/861.52 |
| 7,051,765 B1 * | 5/2006 | Kelley | ....................... | F15D 1/02 138/40 |
| 7,845,688 B2 * | 12/2010 | Gallagher | ............... | F16L 9/147 138/44 |
| 9,217,525 B2 * | 12/2015 | Kobayashi | ............ | F16L 23/024 |
| 2006/0231149 A1 * | 10/2006 | Kulkarni | ................... | G01F 1/42 138/44 |

* cited by examiner

*Primary Examiner* — Patrick F Brinson
(74) *Attorney, Agent, or Firm* — Apogee Law Group P.C.; Francisco A. Rubio-Campos

(57) ABSTRACT

A flow control device that includes an orifice placed in an opening of a duct. A flexible sheet of material is wrapped around a first duct section to include an extended section which is crimped inwardly around the face of the orifice. A sleeve with tightening straps can be wrapped around the aligned first and second duct sections, with the sections having the orifice positioned between. A bead on the duct sections can assist in orifice positioning, attachment, and sealing. The orifice can also be attached to the duct section using tabs and a retention ring. A duct sleeve is also provided for placement in the opening of a duct. The duct sleeve includes a reception slot that receives an orifice plate that is attached in a secure and sealable manner.

17 Claims, 8 Drawing Sheets

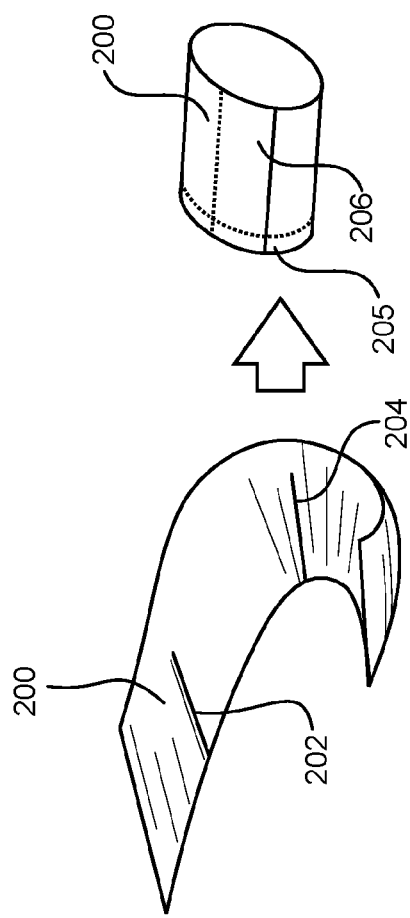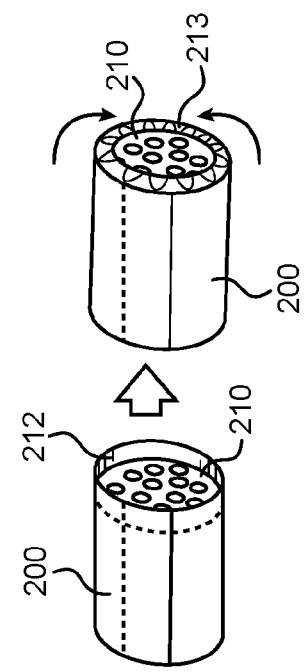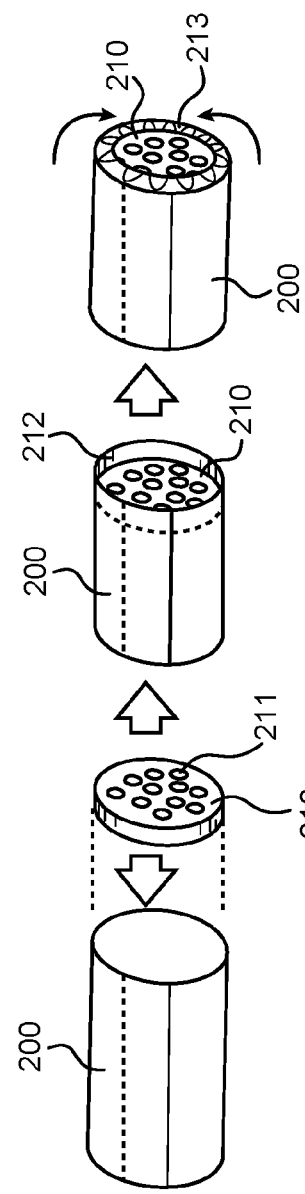

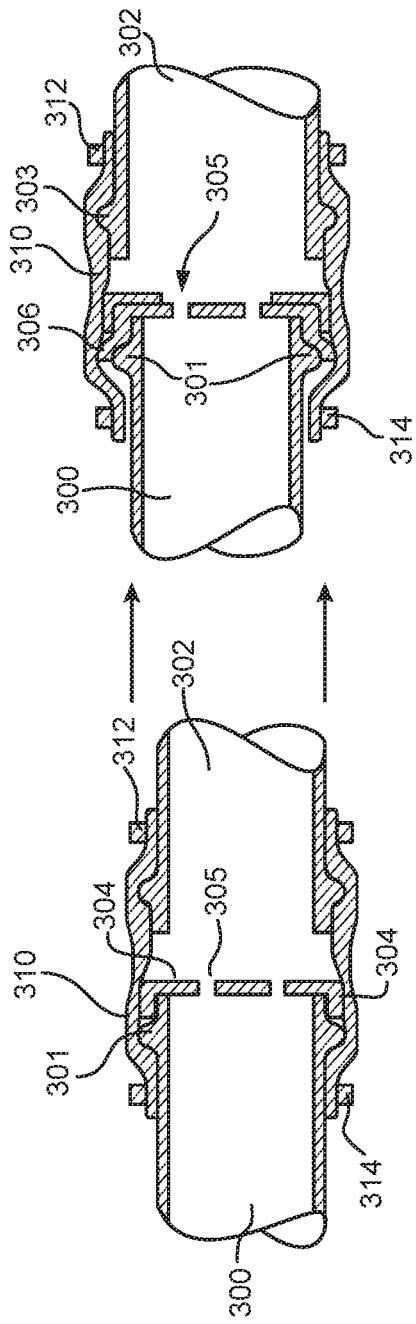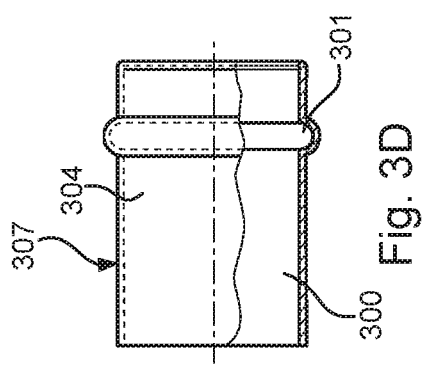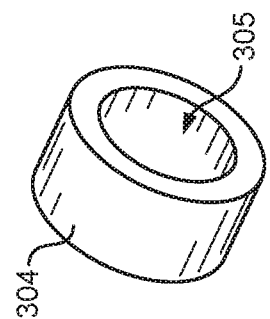

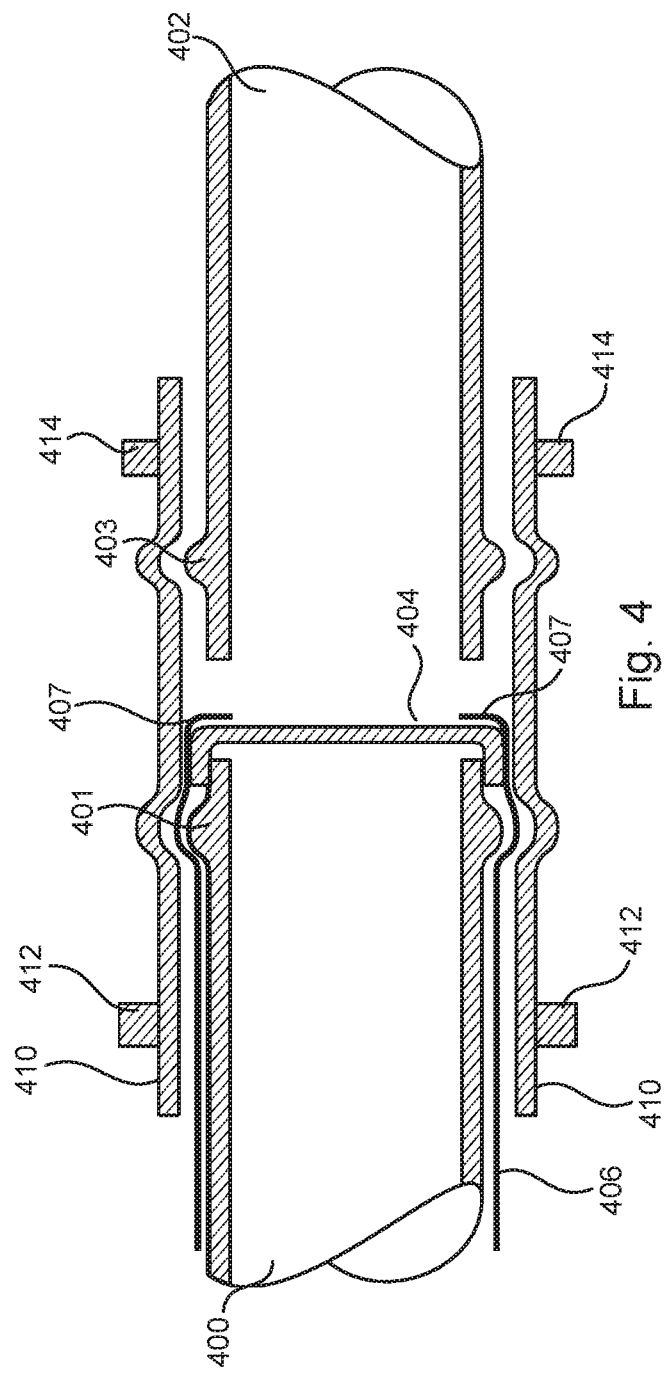

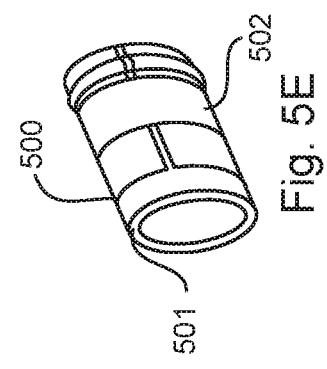
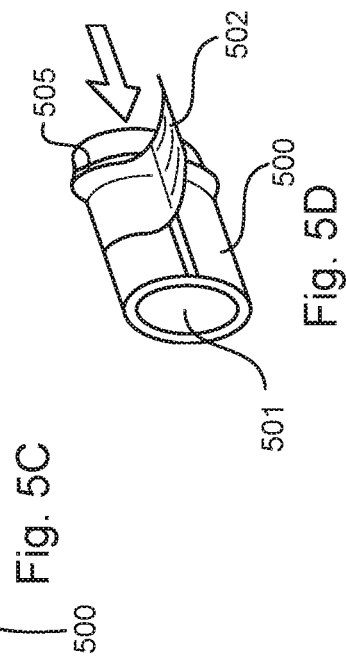
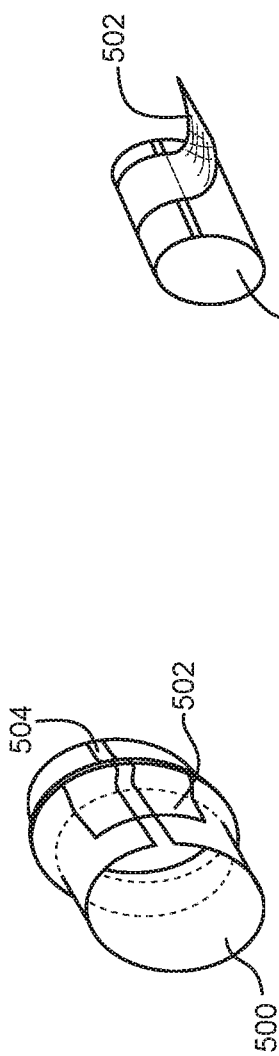
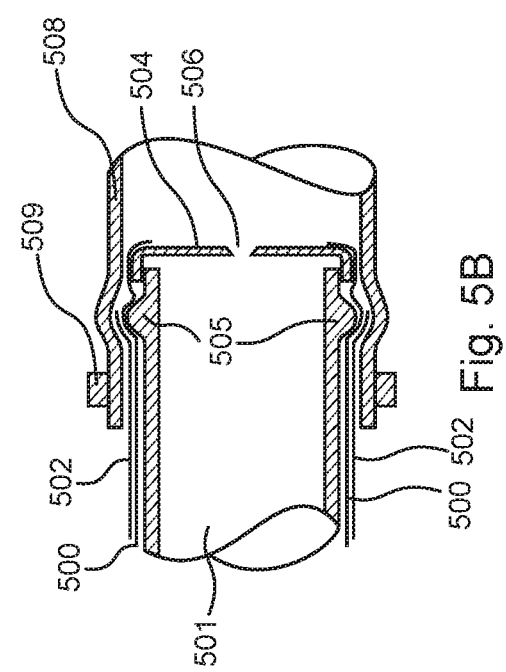

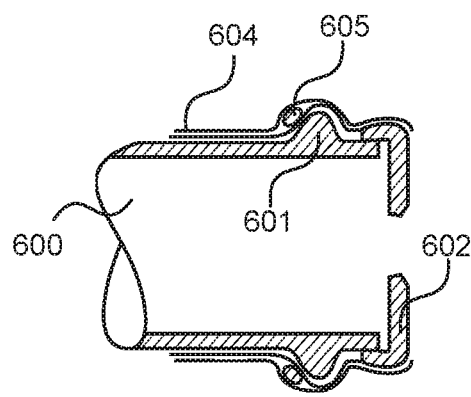
Fig. 6A
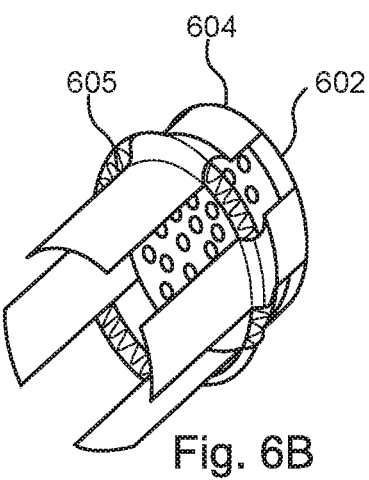
Fig. 6B
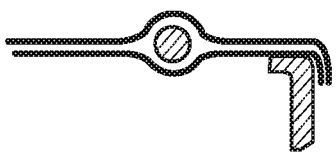
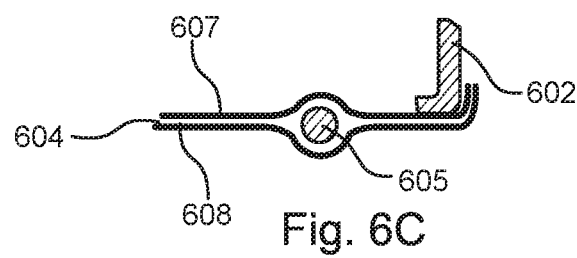
Fig. 6C

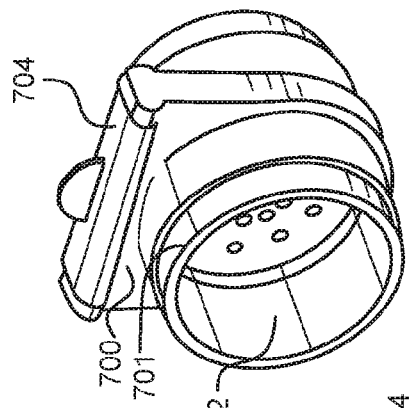
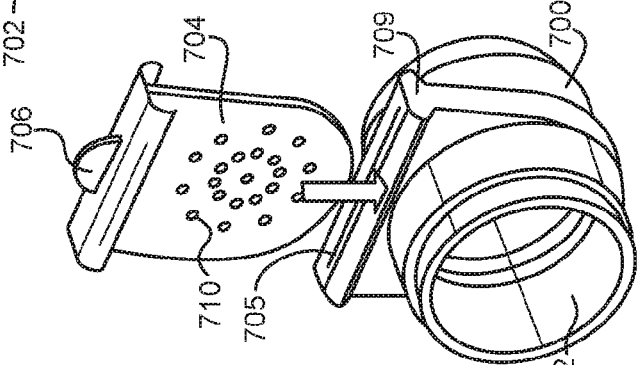
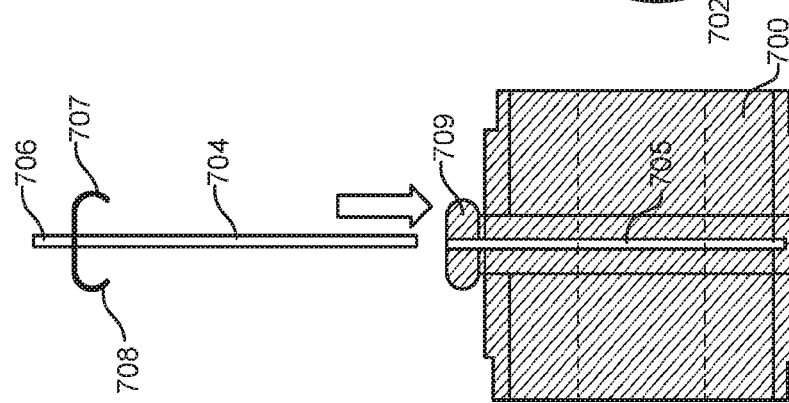
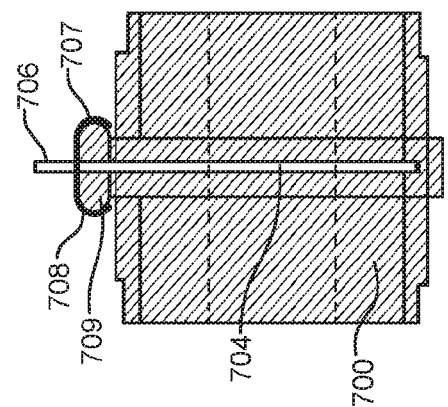

FLOW CONTROL DEVICE AND METHODS OF ATTACHMENT

BACKGROUND

1. Technical Field

The disclosure generally relates to a flow control device for use on ducting arrangements, and methods for quick and efficient attachment of the device.

2. Related Art

Certain structural assemblies might require specified amounts of flow (for instance airflow) to be circulated throughout the structure. The required airflow might, for instance, be related to passenger comfort within the vehicle. Additionally, the required airflow might relate to functional aspects of how the vehicle is meant to perform due to its overall design. Such structural assemblies usually employ a plurality of ducts that are routed throughout the structure so that the airflow can be contained and controlled within such ducts.

One common method to provide ducting is via the use of angled channels or tubes that might vary in thickness and shape due to various design constraints that are associated with providing the required airflow. When designing the layout of ducts within a structure, it is known that airflows will need to be adjusted in the finished structure despite careful considerations during the design phase. Accordingly, the ducting layout will purposefully include breaks in the channels or tubing so that flow restrictors can be inserted at those break points. The flow restrictors are designed to control airflow through the duct, and such restrictors might include a series of holes or throughputs that are calibrated to provide and adjust airflow according to needed structural design constraints.

FIGS. 1A-1C show views of an example existing configuration for attaching a flow restrictor to a duct. FIG. 1A shows a perspective view an example of a prior art orifice restrictor that might be used between two portions of a duct in order to restrict the airflow. An orifice plate 100 is shown attached to the end of a first duct section 102. The orifice plate 100 is shown to include a plurality of holes to restrict the airflow to a desired amount. The holes might be any shape or size, and can be arranged in any pattern. Other airflow opening shapes might also be used, including slots, grills, louvers, or the like.

Currently, one labor intensive aspect of installing such an orifice plate is that the plate is held in place via adhesive 108 that is applied around the periphery of the duct opening before the orifice plate 100 is installed. The adhesive can often take a long time to cure (or dry, or harden) and the adhesive can often produce harmful or annoying fumes during the assembly process. Moreover, if the adhesive is not properly and carefully applied, it can sometimes flow over and block orifice openings that are located close to the edge of the orifice plate.

The orifice plate 100 is shown to also include a plurality of flexible tape attachments 106. The tape attachments are primarily used for identifying the part during assembly. When building highly controlled structures such as aircraft, the various parts are required to carry clear and easily readable part number labels. Hence, in the present example, four such flexible tape attachments 106 are shown on the orifice plate 100. These tape attachments are meant to bend backwards along the surface of the duct, and are thereby readable to identify the part, even after the orifice plate 100 is installed.

The duct usually includes a bead 104 around the opening. The bead 104 is an outward projection along the outer circumference of the duct and allows for ease in finding the designated opening in the duct. For instance, an assembly person might feel for the bead along the duct to quickly identify the opening. The bead 104 can also assist in facilitating the sealing of the duct back together after the orifice plate 102 is installed.

FIG. 1B shows a side view of the duct assembly. The orifice plate 100 is shown attached with adhesive 108 to the end of the duct 102. The bead 104 is shown more pronounced around the circumference of the duct, and is located near the opening in the duct tubing where the orifice plate 100 is attached. The flexible tape attachment 106 is shown bent back along the surface of the duct 102. The tape attachments 106 are generally long enough to extend back and be visible, for identification of the orifice used, even after installation.

FIG. 1C shows a side view of a completed duct assembly, where the first section of the duct tubing 102 is shown extending to the left. The duct bead 104 is shown near the end of the first duct section 102, with the orifice 106 adhesively attached to the end of the first duct section 102. A second duct section 103 is shown placed in alignment with the first duct section, with the orifice 106 positioned between the first and second duct sections. A sleeve 110 is next attached around the aligned first and section duct sections, wherein the sleeve 110 surrounds the aligned sections and provides a sealing interface. At least one tightening strap 112 can be used to secure the sleeve 110 in place around the first and second aligned duct sections.

The flow control device described above requires a labor intensive process to install the orifice onto the duct opening. This process includes applying an adhesive around the duct opening and/or applying the same adhesive to the orifice periphery before attaching it to the duct. The adhesive needs to cure (or dry) before the duct can be put back together, and often the adhesive produces an odor that can be both annoying and dangerous, particularly in closed environments. Additionally, if the distributed duct flow needs to be revised and thus the orifice changed, the bonding process requires additional time to remove the orifice and replace it.

Accordingly, a need exists in the field for a flow control device that can be installed and replaced in a fast, efficient, and straightforward manner, and without the use of external liquid or gel type adhesives to hold the orifice in place.

SUMMARY

A flow control device and method for attachment are provided for restricting the flow of air (or other freely flowing substances) in a duct that might be located in an overall structure having one or more ducts for moving a flow throughout the structure. In one example, the flow control device might include an orifice plate that is placed over an opening in the duct. The orifice plate is then held in place by an integral flexible sheet of material that is wrapped around the end of the duct having the opening. The flexible sheet of material can include one or more slits in the material in order to facilitate wrapping it around the duct section in a smooth and efficient manner. If one or more slits are in the flexible sheets, then optional tape can be used to secure orifice/sheet onto the end of the duct with an integral bead. Prior to assembly to the duct and after being wrapped around the orifice, the flexible sheet can be secured in place by a bond formed on a portion of the overlapped sheet material.

The sheet is positioned to have a portion that extends beyond the duct opening, and the orifice that has been placed over the opening. This extended portion of the sheet is crimped inwardly over the orifice to assist in holding the orifice in place. The orifice includes a certain amount of throughput holes or openings to provide a known flow control. The duct section can also include a bead formed near the opening to further assist in securing the flexible sheet to the duct section. A second duct section is placed in alignment with the first duct section with the orifice positioned between. A sleeve is then wrapped around the aligned first and section duct sections and tightening straps are applied to securely seal the sleeve against the duct sections.

The flow control device and method of attachment can also include an orifice cap that is placed over the end of an opening in a first duct section. The orifice cap can be formed so that it attaches, in a snapping manner, to the first duct section. A bead can be formed near the end of the first duct section, and can help facilitate positioning and attachment of the orifice cap. The orifice cap includes a certain amount of throughput holes or openings to provide a known flow control. A first duct section can thereafter be aligned with the second duct section with the orifice cap positioned between. A sleeve is attached around the aligned duct sections to join them together and hold the orifice cap in place. At least one tightening strap can be used around the sleeve to facilitate securing the sleeve to the aligned first and second duct sections.

The flow control device and method of attachment can also include an orifice device that includes tabs extending from the periphery. Such tabs are generally used for ready identification of the part number, but they can also be used to assist in attaching the orifice device to the duct section. The orifice device is placed on the end of the duct section and the tabs are flattened back along the length of the duct. A retaining ring, or O-ring, is then placed over the tabs. The tabs can include layers and the O-ring can be positioned over a first layer of the tabs, with a second layer of the tabs placed over the positioned O-ring. A thermal weld or adhesive bond can be applied to the first and second layers to assist in holding the O-ring in place in place. The "trapped" O-ring, integral to the orifice/tab assembly, can then be "snapped" over a beaded duct end so that the stretching and contraction of the "trapped" orifice holds it in place over the beaded duct end.

The flow control device and method of attachment can also include duct sleeve that has been modified to include a retaining slot. An orifice plate is placed in the retaining slot and securely held in position via a snap fit interaction between the orifice place and the duct sleeve. Once the sleeve in positioned between two duct sections, the orifice plate can be quickly changed by snapping in a new plate, and therefore the overall flow in a structure can be easily adjusted and dynamically tuned.

Other devices, apparatus, systems, methods, features and advantages of the disclosure will be or will become apparent to one with skill in the art upon examination of the following figures and detailed description. It is intended that all such additional systems, methods, features and advantages be included within this description, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the disclosure. In the figures, like reference numerals designate corresponding parts throughout the different views.

FIG. 2A is a perspective view of representative parts as they are used for attaching a flow control orifice to a duct opening using a flexible sheet that is crimped inwardly to assist in holding the orifice in place.

FIG. 2B is a perspective view of representative parts as they are used for attaching a flow control orifice to a duct opening using a flexible material as it would be wrapped around the end of a duct section and crimped inwardly to assist in holding the orifice in place as shown in FIG. 2A.

FIG. 2C is a view that is the opposite orientation of FIG. 2B, where a flexible material as it would be wrapped around the end of a duct section and crimped inwardly to assist in holding the orifice in place is shown.

FIG. 2D is a perspective view that shows the flow control orifice of FIG. 2A attached to a duct opening using a flexible sheet that is crimped inwardly to assist in holding the orifice in place.

FIG. 2E is a perspective view of representative parts that shows an extended portion of the flexible material being crimped or folded down inwardly over the face of the flow control orifice of FIG. 2A.

FIG. 3A is a cross sectional views of representative parts as they are used for attaching an alternative flow control orifice to a duct opening using a snap fit orifice with or without a securing sleeve.

FIG. 3B is a cross sectional view of a flow control orifice where a snapping action can be provided by having a lip that snap fits, or compressably fits, over a bead.

FIG. 3C shows a perspective view of an orifice cap using a snap fit orifice with or without a securing sleeve.

FIG. 3D shows a side view of an orifice cap as mounted on a duct section 300.

FIG. 4 is a side view of representative parts as they are used for attaching an alternative flow control orifice to a duct opening using an orifice cap and securing sleeve.

FIG. 5A is a perspective view of representative parts as they are used for attaching an alternative flow control orifice to a duct opening using a flexible sheet and tape attachment.

FIG. 5B shows a cross-sectional view of the flow control orifice of FIG. 5A as attached to the duct opening.

FIG. 5C shows a flexible cover wrapped around a duct section, where the cover is positioned to include a bead and an orifice.

FIG. 5D shows tape being applied with the edge placed along the centerline of the bead.

FIG. 5E shows the flexible cover 500 in place around the duct section, and wherein the tape sticks to both sides of the positioned cover to hold the assembly in place.

FIG. 6A is a cross section view of representative parts as they are used for attaching an alternative flow control orifice to a duct opening using flexible tabs that are secured to the duct section using a retention ring or O-ring.

FIG. 6B shows a cross-sectional view of the flow control orifice and representative tabs of FIG. 6A.

FIG. 6C also shows another cross-sectional view of the flow control orifice and representative tabs of FIG. 6A.

FIG. 7A is a perspective view of representative parts including a duct sleeve with a retention slot for receiving an orifice plate.

FIG. 7B shows a duct sleeve having a reception slot.

FIG. 7C the duct sleeve of FIG. 7B is shown with an open reception slot, wherein an orifice plate is then slidably placed into the reception slot.

FIG. 7D shows the orifice plate mounted in place inside the reception slot.

DETAILED DESCRIPTION

Figure 1A:
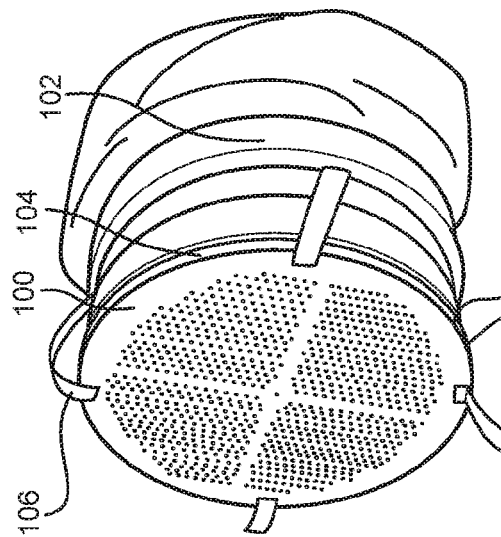
FIG. 1A (Prior Art) is a perspective view of a flow control orifice that has been adhesively attached to a duct opening.
Figure 1B:
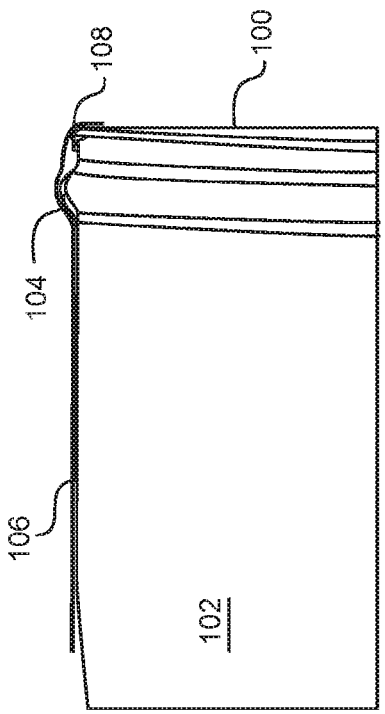
FIG. 1B (Prior Art) is a side view of the flow control orifice that has been adhesively attached to a duct opening as shown in FIG. 1A.
Figure 1C:
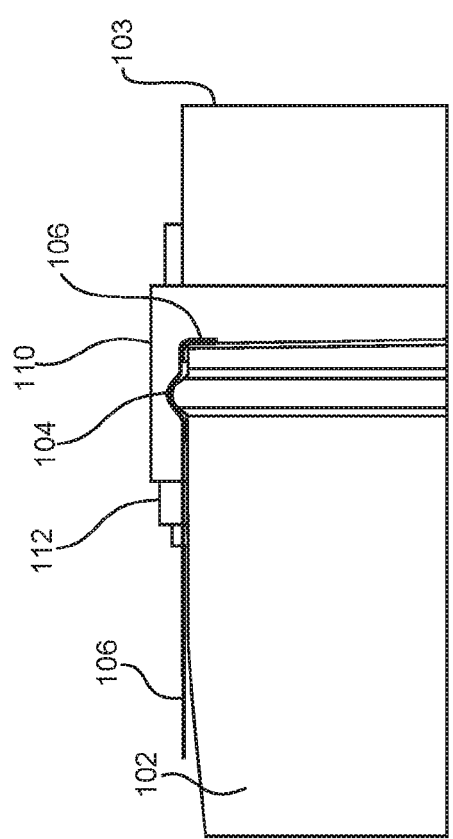
FIG. 1C (Prior Art) is a side view of a completed flow control orifice that has been adhesively attached to a duct opening as shown in FIG. 1A.

FIGS. 2-6 illustrate representative examples of different implementations of the flow control device and methods of the present disclosure. The flow control device is attached to a duct, or duct section, which might be located in an overall structure. The duct might include a tube, or pipe, or any other such device for guiding a flow through the structure. Ducts can include a single tube, or multiple tubes, which are routed through channels or throughputs in the structure. The actual flow to be controlled might include any substance that moves in a flowing manner, including for example, air, gas, liquid, or the like.

FIG. 2A shows a representative sheet 200 of flexible material that is sized and configured to be wrapped around the end of a duct section. The material might include, for example, an insulation or covering film, such as pressure-sensitive, reinforced polyimide tape that is used in the fabrication, repair and installation of thermal and acoustic aircraft assemblies. Optional slits 202 and 204 are shown formed in the flexible material to facilitate wrapping the material around the end of the duct section. The slits help to provide a smoother wrapping action, so that the material conforms to the rounded shape of the duct without wrinkling, binding, or air pockets.

FIG. 2B shows the flexible material as it would be wrapped around the end of a duct section (duct section not shown here for clarity in viewing the shown parts). The material 200 would be wrapped to create enough of an overlap 206 to provide secure attachment of the material 200 to the duct section. Depending on the material, and size of the duct section, this overlap 206 might range from 0.25 to 0.50 inches. An orifice device would be encompassed within the wrapped material 200, in the general area 205. A thermal weld could be applied to the overlap 206 to assist in securely attaching the opposite ends of the material 200 to itself to create a tubular form which would successively be attached to the orifice 210. Alternatively, the flexible material 200 (after orifice 210 has been attached to the material 200 see FIGS. 2D-2E) might be stretchably applied, with the material wrapped around and holding on to the duct section via the relative holding action of the stretching action.

The various embodiments are meant to alleviate the need for a thermal weld or bond of the orifice to the duct. A thermal weld could be used to secure (for instance) a thermoplastic sheet of material to a thermoplastic orifice. If the orifice were made from another substance, such a metal, then there would need to be an adhesive bond. However, this type of adhesive bond could be done in as a prior process in an assembly shop, which would have facilities and/or processes designed to speed such prior assembly. This serves to alleviate the general need for a thermal weld or adhesive bond to be formed between the duct and orifice/sleeve in the various embodiments shown.

FIG. 2C shows a view that is the opposite orientation of FIG. 2B, where the orifice plate or insert 210 is shown being positioned within the wrapped material 200. The orifice 210 includes at least one hole or throughput 211 for allowing substances to pass through the orifice in a controlled manner. A wide variety of holes or throughputs could be used, wherein the allowed flow would be known for different orifices, and the proper orifice would be selected according to the flow desired for different substances flowing through the duct.

FIG. 2D shows the orifice plate 210 in position within the wrapped material 200. In practice, the orifice plate 210 could be pre-assembled to the material 200 which would be wrapped around the orifice plate 210. In wrapping the material 200, an extended portion 212 of the material 200 should extend beyond the mounted orifice 210. FIG. 2E shows the extended portion 212 being crimped or folded down inwardly over the face of the orifice 210. The crimped portion should generally not cover any holes or throughputs in the orifice 210. The crimped portion 213 thereby serves to hold the mounted orifice 210 into place. Once the material 200 and orifice 210 are pre-assembled, they are then secured on the open end of the duct section via stretching action of the tubular shape of the material 200.

Depending upon the configuration and flow control involved, the extended portion 212 could be any length. The extended portion needs to be long enough to assist in secure attachment of the orifice 210 to the material 200, but not so long that any holes or throughputs 211 on the orifice 210 are blocked or impeded. In practice, an extended portion of 0.10 inches has been found to be effective.

FIGS. 3A-3D illustrate an alternative embodiment for attaching a flow control orifice into the flow path of a duct. In this embodiment, the orifice attaches, via a well-formed fit, or snap fit action, to the open end of the duct. In FIG. 3A a cross sectional view of first duct second 300 is shown in alignment with a second duct section 302. A break, or gap, has been formed between these duct sections to facilitate the placement of a flow control device. A representative orifice 304 is shown which is shaped to fit, like a cap in this instance, over the end of the first duct section 302. The orifice 304 can include one or many throughput holes 305 for allowing the flow to pass through in a restricted or known manner.

A bead 301 is shown formed around the circumference of the first duct section 300, proximate to the opening between the duct sections. This bead 301 can serve to facilitate mounting and attaching the orifice 304 to the first duct section 300. A bead 303 is also shown formed around the circumference of the second duct section 302, proximate to the opening between the duct sections. In FIG. 3A, the orifice 304 is shown snapped or placed into position on the first duct section 300, using for instance a well machined fit between the parts. In FIG. 3B, a snapping action can be provided by shaping the orifice 304 to have a lip 306 that snap fits, or compressably fits, over the bead 301. The beads (301 and 303) can also serve to assist an assembler or technician in quickly finding the opening in the duct sections, by feel or viewing of the bead.

FIG. 3C shows a perspective view of an orifice cap 304. A flow throughput hole 305 has been formed in the end of the cap 304. One or more holes 305 might be pre-formed and calibrated to provide a known flow through the orifice. Alternatively, the orifice cap 304 could have a solid end, and one or more holes 305 could be selectively formed to provide a flow desired through the orifice 304.

FIG. 3D shows a side view of an orifice cap 304 as mounted on the duct section 300. In this example, the mounting end 307 of the orifice cap 304 is formed to extend well past the bead 301. A longer mounting end 307 will facilitate a more secure and airtight fit, since more of the orifice cap will be snappably or compressibly secured past the bead 301 and around the duct section 300.

After the orifice 304 is securely placed on the first duct section 300, a second duct section 302 can be aligned with the first duct section, with the orifice 304 positioned between the aligned sections. A sleeve 310 is shown wrapped around the aligned first and second duct sections. The sleeve serves to insulate and seal the joinder of the first and second duct sections. The beads 301 and 303 assist in attaching and securing the sleeve 310 to the aligned first and second sections, by providing an outwardly protruding surface for the sleeve to wrap around and grip. A cross-sectional view of a first and second tightening strap 312 and 314 are shown. At least one such strap can be used to secure the sleeve 310 to the aligned first and second duct sections. When the straps are tightened down, the sleeve 310 is securely attached around the gap between duct sections 300 and 302. Any flow through the ducts will thereby not leak out through the gap between the duct sections. If the straps 312 and 314 are placed close enough to the beads 301 and 303, then the bead will help to hold the sleeve and the straps into place around the aligned sections.

Depending upon the fit of the orifice cap 304, and the configuration desired in the structure needing flow control, a section duct section 302 might not be placed in alignment with the first duct section 301. Accordingly, the first duct section might serve as an end-point for flow control, where the flow will then disperse into an environmental area after it passes through the flow control orifice 304. In such a configuration, an orifice with a more secure fit would be advantageous, as shown for instance in FIG. 3D.

FIG. 4 shows a cross-section of yet another alternative embodiment where a flow restriction device is securely and sealably attached to a first duct section. A first duct section 400 is shown aligned with a second duct section 402, with a gap or break formed between the sections. An orifice 404 might include an orifice cap, orifice plate, or similar such device that is placed over the open end of the first duct section 400. The orifice might be attached using a well machined fit between the parts, or via a snapping action on the end of the first duct section. An insulation cover 406 is shown wrapped around the end of the duct section 400 so as to cover and seal the joinder of the orifice 404 and the first duct section 400. Similar to the flexible sheet (200) described above, the insulation cover 406 can be wrapped to have a portion 407 that extends beyond the mounted orifice 404. The extended portion 407 is then folded or crimped inwardly around the orifice 404 to assist in holding the orifice into place. The insulation cover 406 would also be applied so that any identification tabs (like 106 above) or such part identifiers would remain visible.

The first duct section 400 is also shown to include a bead 401, and the second duct section 402 is shown to include a bead 403. The beads 401, 403 extends around the periphery of the duct sections, proximate to the opening between the duct sections. The bead on the first duct section 400 can serve as a guide and mounting surface for attaching the orifice 404. The bead also provides an outwardly protruding surface to assist in wrapping and securing the insulation cover 406 around the mounted orifice 404 and the first duct section 400.

Also shown is a sleeve 410 that is wrapped around the aligned first and second duct sections 400, 402, which have the orifice 404 positioned between them. The sleeve 410 serves to insulate and sealably join together the duct sections 400 and 402. A cross sectional view of a first securement strap 412 and a second securement strap 414 are shown positioned to hold the sleeve onto the aligned first and second duct sections 400, 402. The straps 412, 414 are positioned inward from the beads 401 and 403, away from the opening. When the straps are tightened, the sleeve 410 seals around the aligned first and second duct sections 400, 402. The beads 401, 403 help to facilitate this seal by providing an outward projecting surface against the tightened sleeve material.

FIGS. 5A-5E serve to illustrate yet another embodiment for attaching a flow control orifice to a duct section. In this embodiment a pre-assembled orifice with integral flexible cover is wrapped around a duct section having a bead, and then the cover is held into place using, for example, an adhesive tape section to secure the opposite ends of the flexible cover over the bead. FIG. 5A shows a perspective view of the flexible cover 500 in its wrapped configuration. The flexible sheet or cover can include one or more slits as described above in FIG. 2. The insulation cover 500 is meant to be a representative material, and it is intended that many other types of materials could readily be used. Such materials can include a plastic-infused woven material which is flexible, but limited in its stretch properties. Another representative example would include a polyvinylflouride material, which is both flexible and has some stretch properties as well. The tape section 502 holds the flexible cover 500 in its wrapped configuration around the beaded duct section. The orifice 504 is shown held in position on the front opening of the duct section by the flexible cover.

FIG. 5B next shows a cross-sectional view of the flow control orifice 504 as attached to the duct section 501. The orifice 504 is cap-like in configuration and fits over the front of the duct section 501. The orifice 504 should include one or more throughput holes 506. The duct section 501 includes a bead 505 that extends around the circumference of the duct section, proximate to the opening. The insulation cover 500 is positioned and wrapped so that the bead 505 and the end of the orifice 504 are encompassed within the wrap. A sleeve 508 is shown wrapped around the first duct section 501 and the next duct section that would be placed in alignment with the first duct section. The next duct section is not shown in this figure to enhance clarity of the shown parts. At least one securing strap 509 is shown for tightening the sleeve around the aligned duct sections. As configured, the bead 505 helps to retain the insulation cover to the duct section 501, and also helps to seal the sleeve against the duct section when the strap 509 is tightened.

FIGS. 5C-5E further illustrate placement of the insulation cover on the duct section 501 using the bead 505 to assist in positioning and attaching the cover. The first step is shown in FIG. 5C, wherein the flexible cover 500 is shown wrapped around the duct section, with the cover is positioned to include the bead 505 and the orifice 504. The flexible cover 500 might include, for instance, a non-stretch material to facilitate the wrapped shape holding onto the bead 505. The tape section 502 is shown being applied to hold the flexible cover 500 in place, wherein the tape section might include a peel ply variety. The tape can be pre-assembled to the flexible sheeting having one or more slits. The extended portion of tape would have backing on it, so that one side of the tape is sticky. Once the orifice with the slitted flexible sleeve is installed over the beaded duct end, then the tape backing is removed from the extended portion of the tape so that it sticks to the opposite side of the flexible slitted material. The should create a firm grip of the material over the beaded duct end.

The second step is shown in FIG. 5D, where the tape 502 is being applied with the edge placed along the centerline of the bead 505. The third step is shown in FIG. 5E, where the flexible cover 500 is in place around the duct section 501, and wherein the tape sticks to both sides of the positioned cover 500 to hold the assembly in place, and wherein the sleeve 508 and straps 509 would be applied thereafter to sealably join the aligned duct sections together.

FIGS. 6A-6C show yet another alternative embodiment for attaching an orifice flow control device to a duct section. In this configuration, a retaining ring, is used to assist in retaining the orifice onto the end of the duct section. FIG. 6A shows a cross-sectional view of a duct section 600 with an orifice cap 602 placed over the open end of the duct section. The duct section includes a bead 601 that extends around the circumference of the duct section, proximate to the open end. The orifice includes tabs 604 (similar to 106 above) which are used for part identification. These tabs might also be used for retention of the orifice cap 602 onto the duct section 600. Accordingly, two or more tabs 604 would be needed along the periphery of the orifice 602, wherein four such tabs are shown in FIG. 6B In the shown configuration, the tab 604 might include a first and second layer. For each included tab, the first tab layer would be stretched or flattened back opposite the direction from the orifice 602. Once all of the first layers of the associated tabs are stretched back in position, a retention ring, or O-ring, 605 is placed over the first layers. The second layer of tabs 604 is placed over the first layer of tabs 604 capturing the retention ring or O-ring 605 in a pocket between the two layers. The two overlapping layers of tabs 604 would then be adhesively bonded or thermally welded together, thus trapping the retention ring, or O-ring 605 permanently. FIG. 6B more clearly demonstrates this configuration by showing a perspective view of the orifice 602 having four representative tabs 604 with the retention ring, or O-ring trapped between the two layers of tabs 604. To enhance clarity of the shown parts, the duct section (while present in the final assembly) is not shown. The O-ring 605 is shown positioned along the inside edge of the bead 601. The O-ring 605 is positioned so that it rests between the first and second layers of the tabs 604. FIG. 6C further illustrates this configuration by showing a cross-sectional view of the orifice 604 and the representative tabs 604. Here the first tab layer 607 is more clearly shown to be positioned underneath the O-ring 605, and the second tab layer 608 is shown to be positioned over the O-ring 605. A thermal weld, or other similar bonding technique, can thereafter be applied to the first and second tab layers 607, 608. The pre-assembled combination of orifice 602, O-ring 605, and first and second tab layers 607, 608 can then be used to install the orifice onto the open end of the duct section 600.

FIG. 7A-7D shows yet another alternative embodiment for inserting a flow control restrictor into a duct path. In this configuration a portion of a duct sleeve is modified to include a reception slot for an orifice, wherein the orifice can be snapped into place to provide a controlled flow restriction in the path of the duct flow. FIG. 7A shows a representative sleeve 700 that includes a mounting surface 701 for attaching a first duct section, and includes a similar mounting surface (not shown here) on the opposite side of the flow opening 702 for attaching a second duct section. An orifice plate 704 is shown already snapped into place in the modified duct sleeve 700. FIG. 7B shows the duct sleeve 700 having a reception slot 705. The slot is configured for receiving the orifice plate 705 which has a handle 706. The plate includes at least one throughput hole 710 for letting the flow pass through in a controlled and known manner. The plate also includes a first and second compression fit lip 707 and 708. The lips 707, 708 are configured to snap fit on an upper mounting surface 709 on the duct sleeve 700. The lips and mounting surface shown are representative examples, and the invention is not meant to be limited to only this design. What is intended is a compression type fit that provides an relatively tight seal so that the flow does not leak out of the reception slot, and the flow is controlled by the inserted orifice plate. The seal could be air tight, or could have a small quantifiable or controlled leakage rate and still be functional in the shown embodiments.

FIGS. 7C and 7D further show cross-sectional views of the duct sleeve 700. In FIG. 7C the duct sleeve 700 is shown with an open reception slot 705. The orifice plate 704 is then slidably placed into the reception slot 705 so that the compression lips 707, 708 engage the mounting surface 709. In FIG. 7D the orifice plate 704 is shown mounted in place inside the reception slot 705. The compression fit lips 707 and 708 spring out and snap fit around the outward projecting nodes on the mounting surface 709. The surface of the orifice plate 704 is thereby configured to extend down into the reception slot 705 to provide a controlled throughput for flow going through the duct.

Figure 8A:
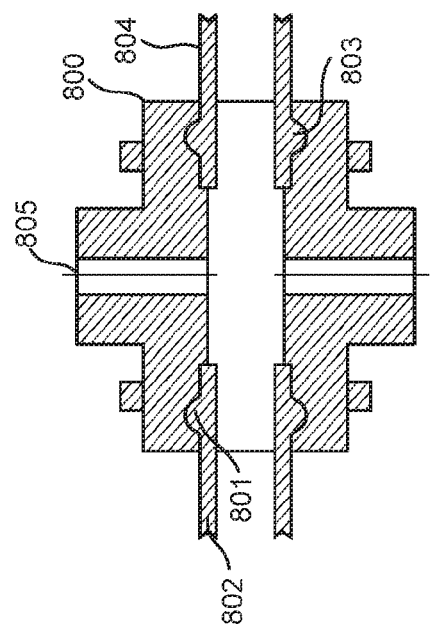
FIG. 8A is a side view of representative parts including alternative duct sleeves and alternative orifice plates, as similar to FIGS. 7A-7D.

FIGS. 8A-8E show side views and perspective views of alternative duct sleeve configurations. FIG. 8A shows a side view of a duct sleeve 800 that is configured to fit between a first duct section 802 and a second duct section 804. Beads 801 and 803 on the first and section duct sections serve to facilitate mounting or attaching the duct sections 802, 804 to the duct sleeve 800. A slot 805 is shown for receiving an orifice plate that is used to control the duct flow.

Figure 8B:
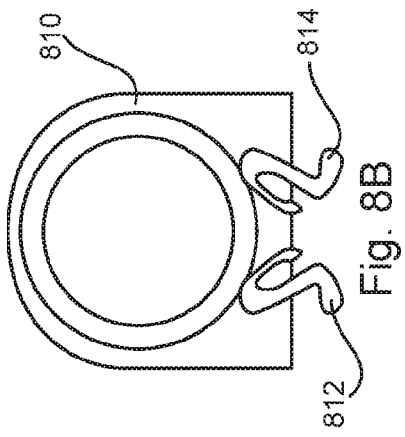
FIG. 8B shows a configuration where a pair of flexible retaining clips are formed on the bottom portion of the sleeve of FIG. 8A.
Figure 8C:
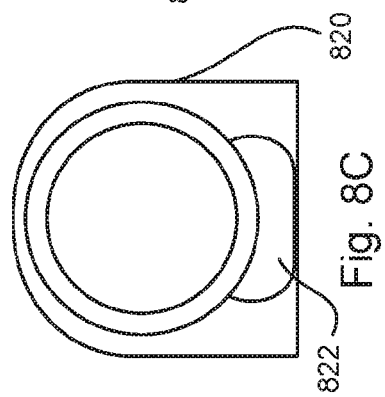
FIG. 8C next shows a front cross sectional view of an orifice sleeve that has an oblong receptacle on the bottom portion of the sleeve.

FIGS. 8B-8C show a front cross sectional views of orifice sleeves 810 and 820 that are meant to similarly fit in between the duct sections 802 and 804. FIG. 8B shows a configuration where a pair of flexible retaining clips 812 and 814 are formed on the bottom portion of the sleeve 810. FIG. 8C next shows a front cross sectional view of an orifice sleeve 820 that has an oblong receptacle 822 on the bottom portion of the sleeve 820.

Figure 8D:
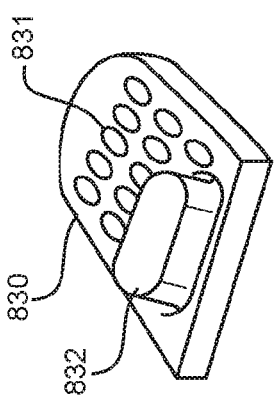
FIG. 8D a perspective view of an orifice plate with at least one throughput hole formed therein, wherein a lower portion of the plate includes an oblong flange or protrusion.
Figure 8E:
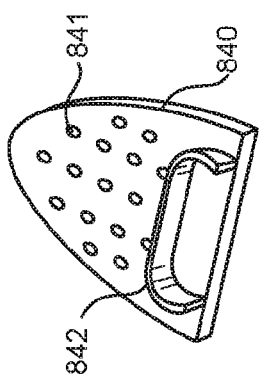
FIG. 8E shows a perspective view of an orifice plate with at least one throughput hole formed therein, wherein a lower portion of the plate includes an arc shaped protrusion or flange having curved outer ends.

FIGS. 8D-8E next show representative orifice plates that might be slidably mounted in the slot 805 of the example duct sleeves. FIG. 8D shows a perspective view of an orifice plate 830 with at least one throughput hole 831 formed therein. The lower portion of the plate 830 includes an oblong flange or protrusion 832. The flange or protrusion might be made to extend from one or both sides of the orifice plate. The orifice plate 830 might be formed from a harder type of material, to facilitate insertion into the slot (805). The flange 832 might be formed from a softer and more flexible material. FIG. 8E shows a perspective view of an orifice plate 840 with at least one throughput hole 841 formed therein. The lower portion of the plate 840 includes an arc shaped protrusion or flange 842 having curved outer ends. The flange or protrusion might be made to extend from one or both sides of the orifice plate. The flange 842 might be formed from the same rigid material as the orifice plate 840.

Accordingly, the orifice plate configuration as shown in 830 might be inserted in the receiving slot of the sleeve 820. The softer material would flex inward to snappably or compressibly secure the orifice plate 830 in the receptacle 822, and thereby hold the orifice in place inside the receiving slot of the sleeve 820. The orifice plate 840 might be inserted in the receiving slot of sleeve 810. The rigid material of the flange 842 would snappably or compressably flex back the clips 812 and 814. The clips would thereby securely hold the orifice plate 840 in position within the slot of the orifice sleeve 810.

The duct sleeve configurations shown are meant to be representative in their relative shapes and configurations, and other such working arrangements are meant to be included within the scope of the intended embodiments. This duct sleeve arrangement provides a quick way for the orifice plates to be interchanged. Such sleeve configurations allow a user to easily fine tune the flow going through the duct. This can be advantageous in structures have a plurality of ducts which were designed to require certain flow parameters, but wherein the actual built structure does not meet these exact flow requirements. The flow can be thereby be dynamically tuned by inserting different orifice plates in the duct sleeves until the required flow is achieved throughout the structure.

While particular implementations of the present disclosure have been described herein as being applied to flow control orifice configurations and the attachment thereof, persons skilled in the art will appreciate that the flow control orifice configurations of the present invention may be incorporated into structures of various sizes and shapes and is not limited to the implementations described above, but may vary based upon the desired application. Persons skilled in the art will also appreciate that attachment of a flow control orifice into a duct that provides flow can be achieved by similar arrangements that are meant to be included in the scope of the invention.

The flow control orifice devices and related attachment methods according to the present invention provide many advantages over existing configurations used to mount or install flow control devices in a duct or duct system. These advantages include the quick installation of the flow control orifice devices without the use of any external adhesives, which might cause harmful vapors and also take considerable time to dry. Additionally, the orifice devices and attachment methods according to the present invention can be quickly removed and reinstalled, as needed, without the need to break any adhesive bonds formed with external adhesives.

In general, terms such as "coupled to," and "configured for coupling to" and "secured to" and "attached to" (for example, a first component is "coupled to" or "is configured for coupling to" or is "secured to" a second component or is "attached to" a second component), or "communicate" (for example, a first component "communicates with" or "is in communication with" a second component) are used herein to indicate a structural, functional, mechanical, electrical, signal, optical, magnetic, electromagnetic, ionic or fluidic relationship between two or more components (or elements, features, or the like). As such, the fact that one component is said to couple (or secure, or attach) to a second component is not intended to exclude the possibility that additional components may be present between, and/or operatively associated or engaged with, the first and second components.

Although the previous description only illustrates particular examples of various implementations, the present disclosure is not limited to the foregoing illustrative examples. A person skilled in the art is aware that the disclosure as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A flow control device for regulating flow in a duct, the flow control device comprising:
   an orifice which is positioned to cover one end of an opening in the duct;
   a flexible sheet which is wrapped around one end of the opening in the duct, the sheet being positioned to have an extended portion that extends beyond the end of the opening;
   wherein the extended portion is crimped inwardly over the orifice to hold the orifice in place on the end of the duct.

2. The flow control device of claim 1, further comprising at least one slit formed in the flexible sheet to facilitate smoothly wrapping the flexible sheet around the duct.

3. The flow control device of claim 1, further comprising a bead formed on the duct near the opening, the bead providing a protrusion to assist in retaining the flexible sheet.

4. The flow control device of claim 1, wherein the orifice includes holes formed to provide a known level of flow control.

5. The flow control device of claim 1, further comprising an opposing duct section, the opposing duct section being positioned against the orifice that has been attached to the opening.

6. The flow control device of claim 5, further comprising a sleeve that is attached around the duct and the opposing duct section to securely join them together.

7. The flow control device of claim 6, wherein the sleeve includes at least one tightening strap for securing the sleeve to the duct and opposing duct section.

8. A flow control device for regulating flow in a duct having a first duct section with an open end and a second duct section with an open end with a flow control opening between the aligned duct sections, the flow control device comprising:
   an orifice which is positioned to cover the open end of the first duct section, wherein the open end of second duct section is aligned with the open end of the first duct section, and the orifice is positioned between the first and second duct sections;
   a sleeve positioned around the aligned first and second duct sections for securely joining the duct sections together, and for holding the orifice in position,
   wherein the orifice is configured for attaching onto the end of the first duct section using a snap fit action or compression fit action.

9. The flow control device of claim 8, further comprising a bead formed on the first duct section near the opening, the bead providing a protrusion to assist in positioning and retaining the orifice.

10. The flow control device of claim 8, wherein the orifice includes at least one opening formed to provide a known level of flow control.

11. The flow control device of claim 8, wherein the sleeve includes at least one tightening strap for securing the sleeve to the aligned first and second duct sections.

12. A method for attaching a flow control device to a duct having an opening, the method comprising:
   placing a material or structure on the end of the duct proximate to the opening;
   placing an orifice so that it is held in place by the material or structure so as to restrict the flow through the opening;
   wherein the orifice can be interchangeably remove and reinstalled via interaction with the material or structure, wherein the material or structure includes a flexible sheet, and further comprising:
   wrapping the flexible sheet around the duct so that a portion of the sheet extends beyond the opening and the orifice;
   crimping the extended portion of the flexible sheet around the orifice, so that the orifice is held in place by the flexible sheet.

13. The method for attaching a flow control device of claim 12, further comprising forming at least one slit in the flexible sheet to facilitate smoothly wrapping the flexible sheet around the duct.

14. The method for attaching a flow control device of claim 13, further comprising forming a bead on the duct near the opening, the bead providing a protrusion to assist in retaining the flexible sheet.

15. The method for attaching a flow control device of claim 12, wherein the material or structure includes a duct sleeve having a reception slot, and the orifice includes an orifice plate, and further comprising:
   placing the duct sleeve on the end of the duct;
   inserting the orifice plate in the reception slot of the duct sleeve,
   wherein the orifice plate is readily interchangeable to provide different flow rates through the duct.

16. The method for attaching a flow control device of claim 15, wherein the duct sleeve includes a mounting surface proximate to the reception slot, and further comprising:
   securely attaching the orifice plate to the duct sleeve via secure interaction between the orifice plate and the mounting surface.

17. The method for attaching a flow control device of claim 16, wherein the duct sleeve includes a mounting receptacle and the orifice plate includes a flange, and further comprising:
   securely attaching the orifice plate to the duct sleeve by placing the flange within the mounting receptacle.

\* \* \* \* \*